United States Patent
Nagano

(10) Patent No.: US 10,293,682 B2
(45) Date of Patent: May 21, 2019

(54) WORKING VEHICLE

(71) Applicant: ISEKI & CO., LTD., Matsuyama-shi (JP)

(72) Inventor: Ryota Nagano, Ehime-ken (JP)

(73) Assignee: ISEKI & CO., LTD., Matsuyama-shi (JP)

( * ) Notice: Subject to any disclaimer, the term of this patent is extended or adjusted under 35 U.S.C. 154(b) by 0 days.

(21) Appl. No.: 15/634,633

(22) Filed: Jun. 27, 2017

(65) Prior Publication Data

US 2018/0001762 A1   Jan. 4, 2018

(30) Foreign Application Priority Data

Jun. 30, 2016   (JP) ................................ 2016-130467

(51) Int. Cl.
| | | |
|---|---|---|
| *B60K 13/04* | (2006.01) | |
| *B60K 15/063* | (2006.01) | |
| *F01N 3/08* | (2006.01) | |
| *F01N 13/08* | (2010.01) | |
| *F01N 13/14* | (2010.01) | |

(52) U.S. Cl.
CPC ............ *B60K 13/04* (2013.01); *B60K 15/063* (2013.01); *F01N 3/08* (2013.01); *F01N 13/08* (2013.01); *F01N 13/14* (2013.01); *B60K 2015/0636* (2013.01); *B60Y 2200/221* (2013.01); *B60Y 2410/114* (2013.01); *F01N 2590/08* (2013.01)

(58) Field of Classification Search
CPC ......... B60K 13/04; B60K 15/063; F01N 3/08; F01N 13/08; F01N 13/14; F01N 2590/08; F01N 3/2066

USPC ........................................................ 180/309
See application file for complete search history.

(56) References Cited

U.S. PATENT DOCUMENTS

| | | | | | |
|---|---|---|---|---|---|
| 4,020,915 | A | * | 5/1977 | Darnell | B60K 13/04 |
| | | | | | 180/296 |
| 5,738,380 | A | * | 4/1998 | Zipser | B60K 15/03 |
| | | | | | 137/571 |
| 6,584,768 | B1 | * | 7/2003 | Hecker | F01N 3/035 |
| | | | | | 55/318 |
| 7,478,700 | B2 | * | 1/2009 | Connelly | B60K 13/04 |
| | | | | | 180/296 |
| 8,919,486 | B2 | * | 12/2014 | Nakagami | E02F 9/0866 |
| | | | | | 180/309 |
| 9,151,253 | B2 | * | 10/2015 | Bunnell | F02M 35/088 |
| 9,168,799 | B2 | * | 10/2015 | Ellis | B60D 1/24 |
| 9,266,426 | B2 | * | 2/2016 | Garza | B60R 3/02 |
| 9,309,800 | B2 | * | 4/2016 | Adupala | F01N 13/08 |

(Continued)

FOREIGN PATENT DOCUMENTS

JP   2007-269242   10/2007

*Primary Examiner* — James A Shriver, II
*Assistant Examiner* — Brian L Cassidy
(74) *Attorney, Agent, or Firm* — Oblon, McClelland, Maier & Neustadt, L.L.P.

(57) ABSTRACT

A working vehicle according to an embodiment includes an exhaust pipeline and a cover. The exhaust pipeline includes an exhaust gas purification device provided to stand on one of left and right sides of a running vehicle body. The cover is provided to cover at least a peripheral surface of the exhaust gas purification device of the exhaust pipeline and has an opening in a bottom thereof. The cover has a plurality of vent holes with a diameter less than that of the opening that are formed above the opening.

4 Claims, 6 Drawing Sheets

(56) References Cited

U.S. PATENT DOCUMENTS 9,663,017 B2 * 5/2017 Ellis .................. B60P 3/2215
9,803,533 B2 * 10/2017 Nagano ................ F01N 13/14

* cited by examiner

BACKWARD ←——→ FORWARD

_(US 10,293,682 B2)_

WORKING VEHICLE

CROSS-REFERENCE TO RELATED APPLICATION(S)

The present application claims priority to and incorporates by reference the entire contents of Japanese Patent Application No. 2016-130467 filed in Japan on Jun. 30, 2016.

BACKGROUND OF THE INVENTION

1. Field of the Invention

The present invention relates to a working vehicle.

2. Description of the Related Art

Conventionally, there has been a working vehicle such as an agricultural tractor where a tail pipe that forms an exhaust pipeline that discharges exhaust gas from an engine is provided to stand close to a cabin frame provided in front of a cabin that composes an operation part of a running vehicle body. Such a tail pipe becomes a high temperature, and hence, is covered by a cover (see, for example, Japanese Laid-open Patent Publication No. 2007-269242).

However, in a conventional working vehicle as described above, a foreign substance such as a grass or a branch may be introduced into an inside of a cover that covers an exhaust pipeline such as a tail pipe so as to accumulate the introduced foreign substance inside the cover. As a foreign substance accumulates inside a cover that covers an exhaust pipeline, a problem may occur in such a manner that heat is trapped inside the cover, or the like.

SUMMARY OF THE INVENTION

It is an object of the present invention to at least partially solve the problems in the conventional technology.

According to an aspect of the present invention, there is provided a working vehicle, including an exhaust pipeline that includes an exhaust gas purification device, and a cover that is provided to cover at least a peripheral surface of the exhaust gas purification device of the exhaust pipeline and has an opening in a bottom thereof, wherein the cover has a plurality of vent holes with a diameter less than that of the opening that are formed above the opening.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a working vehicle as disclosed in the present application will be described in detail with reference to the accompanying drawings. This invention is not limited by an embodiment as illustrated below.

General Configuration of Working Vehicle (Tractor)

Figure 1:
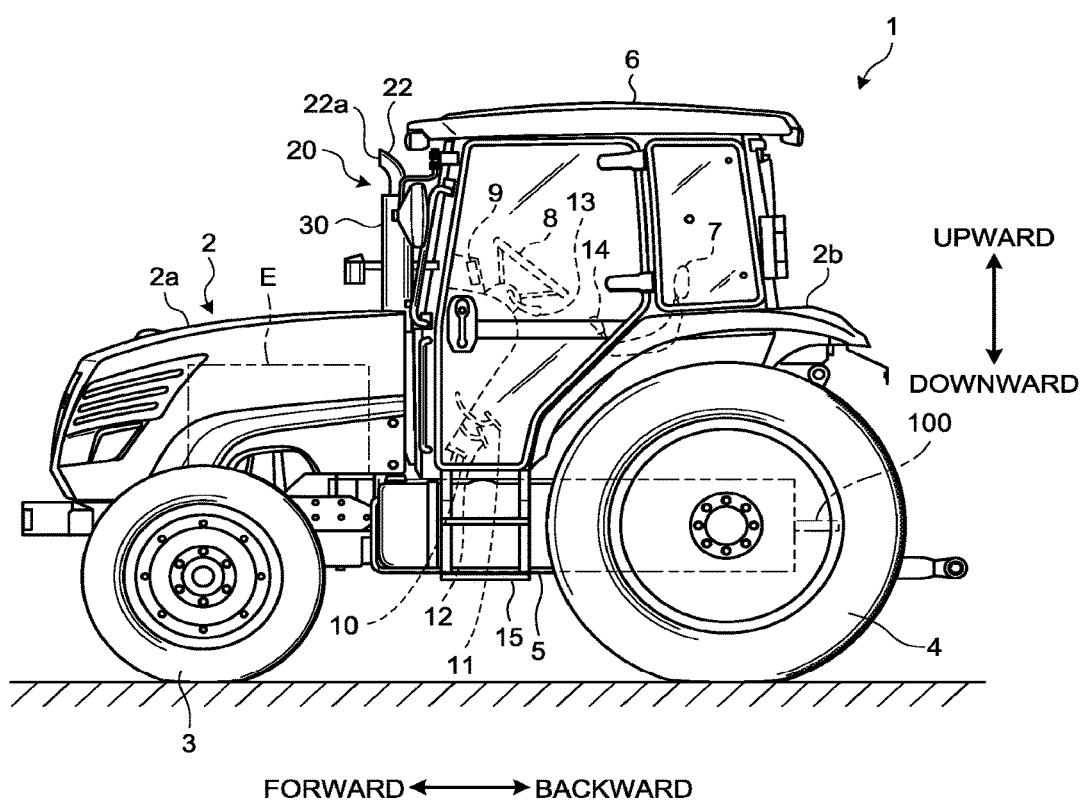
FIG. 1 is a schematic side view of a working vehicle.

A general configuration of a working vehicle 1 according to the present embodiment will be described with reference to FIG. 1. FIG. 1 is a schematic side view of the working vehicle 1. Hereinafter, an agricultural tractor will be described as an example of the working vehicle 1.

In the following description, forward and backward directions are along a traveling direction of a working vehicle, namely, the tractor 1 when traveling in a straight line, where a front side and a back side in the traveling direction are defined as "forward" and "backward", respectively. A traveling direction of the tractor 1 is a direction from an operation seat 7 toward a steering wheel 8 as described later at a time when the tractor 1 travels in a straight line.

Leftward and rightward directions are directions that are horizontally orthogonal to forward and backward directions. Herein, leftward and rightward ones are defined with respect to a "forward" direction. That is, in a state where an operator is seated at the operation seat 7 and faces forward, a left hand side and a right hand side are "leftward" and "rightward", respectively. Moreover, upward and downward directions are vertical directions. Forward and backward directions, leftward and rightward directions, and upward and downward directions are mutually three-dimensionally orthogonal.

As illustrated in FIG. 1, the tractor 1 includes each of front wheels 3, 3 provided on left and right sides of a front part (hood 2a) of a running vehicle body 2 and rear wheels 4, 4 provided on left and right sides of a rear part of the running vehicle body 2. The front wheels 3, 3 are wheels for steering and the rear wheels 4, 4 are wheels for driving. In the following description, each of the tractor 1 and the running vehicle body 2 may be referred to as a "machine body" without distinguishing therebetween.

The tractor 1 includes a hood 2a that forms a front part of the running vehicle body 2 and covers an engine E in the front part of the running vehicle body 2. Rotational power from the engine E installed inside the hood 2a is transmitted to a transmission device (illustration omitted) in a transmission case 5 where the transmission device executes appropriate deceleration, and is transmitted to driving wheels, namely, the rear wheels 4, 4.

The transmission device allows rotational power from the engine E to be transmitted to the front wheels 3, 3, as needed. In such a case, four-wheel driving with the front wheels 3, 3 and the rear wheels 4, 4 is executed. That is, the transmission device allows switching between two-wheel driving and four-wheel driving. The engine E is, for example, a diesel engine with compression-type ignition.

The tractor 1 includes the operation seat 7 and the steering wheel 8 in a cabin 6 provided at a rear part of the running vehicle body 2. The operation seat 7 is a seat where an operator is seated for a machine body operation. The steering wheel 8 is provided in front of the operation seat 7. An operator operates the steering wheel 8 to steer the front wheels 3, 3. In the following description, an operator may be referred to as a "worker" that works in farm field or the like.

A dashboard 9 with a variety of instruments such as a meter panel being incorporated therein is provided in front of the steering wheel 8 in the cabin 6. Moreover, a variety of operation pedals such as an accelerator pedal 10, a clutch pedal 11, and a brake pedal 12, a variety of operation levers such as a forward/backward travel switching lever 13, a main transmission lever 14, and a sub-transmission lever (illustration omitted), or the like are provided around the operation seat 7 in the cabin 6.

The tractor 1 includes rear fenders 2b, 2b provided on left and right sides of a rear part of the running vehicle body 2. The rear fenders 2b, 2b on left and right sides are provided so as to cover a top to a front of each of the rear wheels 4, 4 on left and right sides. The rear fenders 2b, 2b cover the rear wheels 4, 4, so that scatter of soil, mud, or the like disturbed by the rear wheels 4, 4 (mud splash) is prevented.

A variety of working machines are coupled to a front part or a rear part of the running vehicle body 2 in the tractor 1. In a case where such a working machine is coupled to, for example, a rear part of the running vehicle body 2, rotational power from the engine E is transmitted via a power take-off (PTO) shaft 100 that protrudes backward from the rear part of the running vehicle body 2.

Intake and Exhaust System of Working Vehicle (Tractor)

Herein, an example of each of an intake system and an exhaust system of the engine E of the tractor 1 will be described. An intake system of the engine E of the tractor 1 is to supply air to combustion chambers of the engine E, and air that is supplied to the combustion chambers of the engine E flows therethrough. Although not being illustrated in the drawings, the tractor 1 includes, for example, an air cleaner, a compressor of a turbocharger, an intercooler, and the like that are connected each other via an intake pipe, as an intake system of the engine E.

In such an intake system, air that is supplied to the engine E is introduced, for example, through an air cleaner, supercharged by a compressor of a turbocharger, subsequently cooled by an intercooler, and supplied to each combustion chamber.

An exhaust system of the engine E of the tractor 1 is to apply a predetermined process to exhaust gas after a gas mixture of a fuel and air is combusted in combustion chambers of the engine E, and subsequently discharge the exhaust gas with the process having been applied thereto to an outside thereof (atmosphere), and the exhaust gas that is discharged from the combustion chambers of the engine E flows therethrough. Although not being illustrated in the drawings, the tractor 1 includes, for example, a turbine of a turbocharger, an exhaust gas purification device that purifies and processes exhaust gas, and the like that are connected each other via an exhaust pipe, as an exhaust system of the engine E.

In such an exhaust system, exhaust gas from the engine E is introduced, for example, from each combustion chamber into a turbine of a turbocharger, then purified or processed in an exhaust gas purification device after the turbocharger works as a working medium, and discharged through an exhaust port 22a of a tail pipe 22 as described later to atmosphere.

Figure 2:
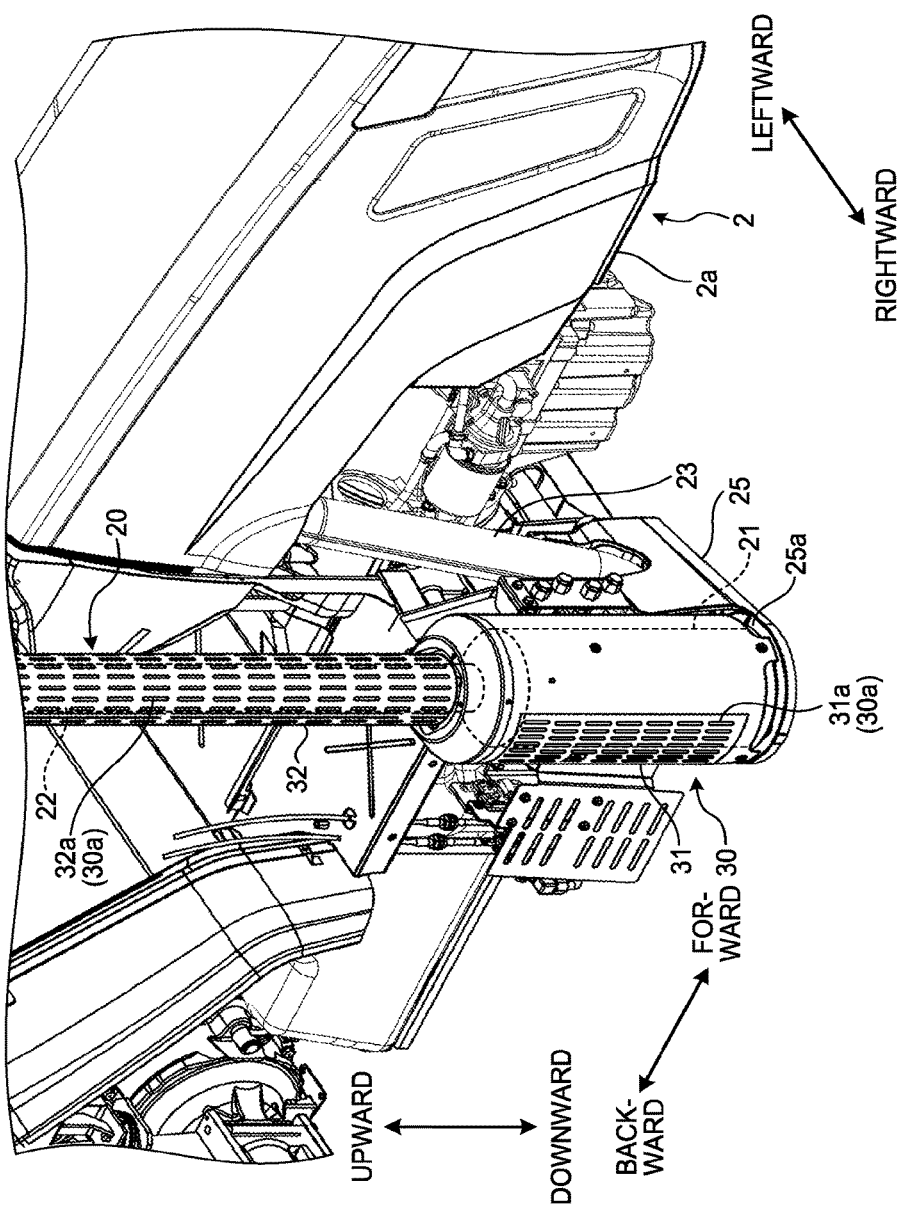
FIG. 2 is an illustration diagram of an exhaust pipeline.

An exhaust gas purification device is to eliminate an air pollutant in exhaust gas, and includes a first exhaust gas purification device (illustration omitted) and a second exhaust gas purification device 21 (see FIG. 2).

The first exhaust gas purification device is provided inside the hood 2a, and arranged, for example, above the engine E. The second exhaust gas purification device 21 is provided outside the hood 2a, and arranged on one of left and right sides of the hood 2a (a right side of the hood 2a in an illustrated example).

The first exhaust gas purification device is, for example, a Diesel Oxidation Catalyst (DOC) that efficiently oxidizes nitrogen monoxide (NO) in exhaust gas. The second exhaust gas purification device 21 is, for example, a Selective Catalytic Reduction (SCR) that uses a urea water solution.

The exhaust gas purification device eliminates nitrogen oxides ($NO_x$) in exhaust gas in such a manner that nitrogen monoxide (NO) in the exhaust gas is converted into nitrogen dioxide ($NO_2$) in the first exhaust gas purification device (DOC) and a urea water solution is supplied to the nitrogen dioxide ($NO_2$) to convert the nitrogen dioxide ($NO_2$) into water ($H_2O$) and nitrogen gas ($N_2$) in the second exhaust gas purification device (SCR) 21. It is preferable to have both the DOC and the SCR in order to eliminate a defined amount of nitrogen oxides ($NO_x$).

Exhaust Pipeline

Figure 3:
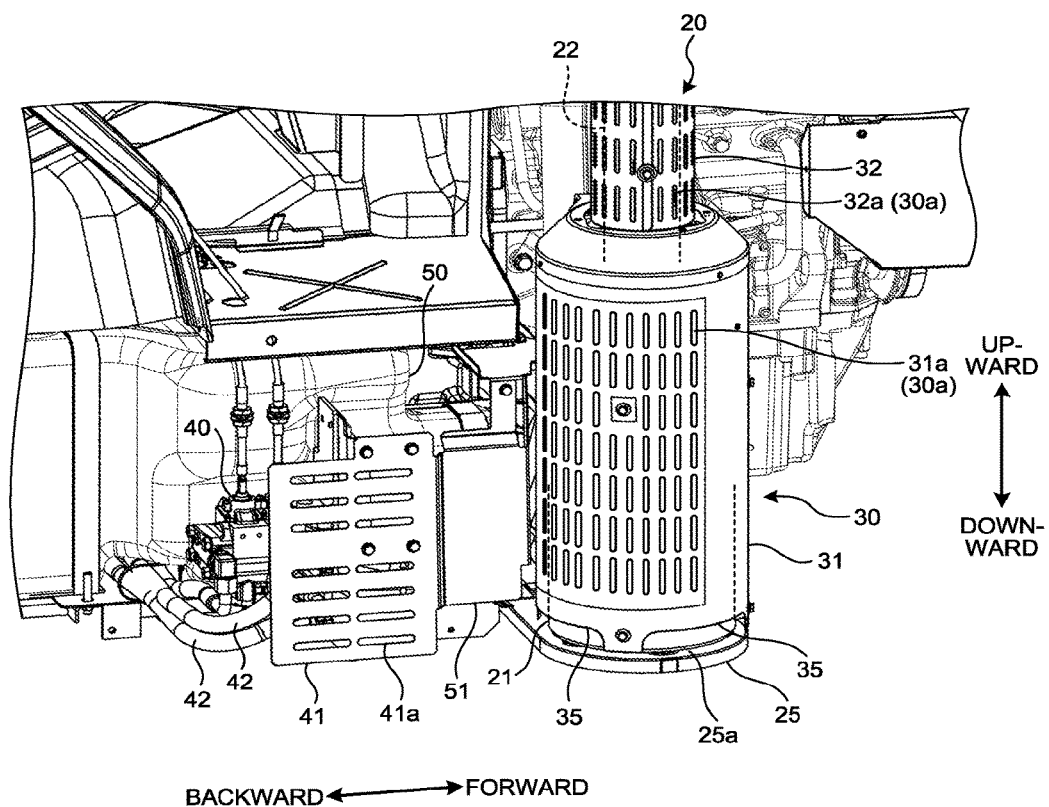
FIG. 3 is an illustration diagram of an exhaust gas purification device and a cover.

Next, an exhaust pipeline 20 that forms a part of an exhaust system of the tractor 1 will be described with reference to FIG. 2 and FIG. 3. FIG. 2 is an illustration diagram of the exhaust pipeline 20. FIG. 3 is an illustration diagram of the exhaust gas purification device (second exhaust gas purification device) 21 and a cover 30. FIG. 2 illustrates a case where a machine body is viewed from a diagonally forward right side and FIG. 3 illustrates a case where the machine body is viewed from a right side.

The exhaust pipeline 20 is a pipeline provided outside the hood 2a among pipelines that forms an exhaust system of the tractor 1. The exhaust pipeline 20 includes the second exhaust gas purification device 21 and a tail pipe 22.

As illustrated in FIG. 2, the second exhaust gas purification device (that will be referred to as an "SCR" below) 21 is formed into a cylindrical shape. The SCR 21 is provided to stand on a mounting surface 25a of a supporting member 25 that extends from a side of the running vehicle body 2 on a one of left and right sides (a right side in an illustrated example) of the running vehicle body 2.

Exhaust gas that has been primarily processed in the first exhaust gas purification device (that will be referred to as a "DOC" below) is flown into the SCR 21. As described above, a urea water solution is supplied to nitrogen dioxide ($NO_2$) to convert the nitrogen dioxide ($NO_2$) into water ($H_2O$) and nitrogen gas ($N_2$) in the SCR 21. Thereby, nitrogen oxides ($NO_x$) in exhaust gas are eliminated. Exhaust gas that has been secondarily processed in the SCR 21 is discharged through an exhaust port 22a (see FIG. 1) of the tail pipe 22 to atmosphere.

A peripheral surface of the SCR 21 is covered by a cover 30 as described later. Thus, a peripheral surface of the SCR 21 is covered thereby, so that it is possible to improve a heat insulating effect between the SCR 21 that is provided at a high temperature and an outside thereof, and safety thereof is improved. The DOC and the SCR 21 are connected via a pipe 23.

The tractor 1 includes a urea water solution tank (illustration omitted) that stores a urea water solution that is supplied to the SCR 21. A urea water solution tank is provided on, for example, the other of left and right sides of the running vehicle body 2, that is, a side opposite to a side where the SCR 21 is provided. Thus, the SCR 21 is arranged on one of left and right sides of the running vehicle body 2 and a urea water solution tank is arranged on the other, so that it is possible to utilize a space of a machine body effectively and provide a good weight balance of the machine body.

As illustrated in FIG. 2, the tail pipe 22 is provided on top of the SCR 21 so as to protrude upward from an upper surface of the SCR 21. The tail pipe 22 extends along a supporting post of the cabin 6 (see FIG. 1). The exhaust port 22*a* (see FIG. 1) of the tail pipe 22 that is provided on a front end thereof is directed forward.

As illustrated in FIG. 2 and FIG. 3, a peripheral surface of the SCR 21 and a peripheral surface of the tail pipe 22 are covered by the cover 30. The cover 30 is formed of a heat shield material and includes a lower cover 31 that covers the SCR 21 and an upper cover 32 that covers the tail pipe 22. The lower cover 31 is formed into a cylindrical shape and is arranged around a periphery of the SCR 21 at a predetermined space from a peripheral surface of the SCR 21.

The upper cover 32 is provided on top of the lower cover 31 so as to protrude from an upper surface of the lower cover 31. The upper cover 32 is formed into a cylindrical shape and arranged around a periphery of the tail pipe 22 at a predetermined space from a peripheral surface of the tail pipe 22. Thus, the SCR 21 and the tail pipe 22 are covered by the cover 30, so that it is possible to improve a heat insulating effect between the SCR 21 and the tail pipe 22. For example, it is also possible to prevent a worker from contacting the SCR 21 and the tail pipe 22 that are provided at a high temperature and safety thereof is improved.

The cover 30 has a plurality of vent holes 30*a*. That is, the lower cover 31 and the upper cover 32 that compose the cover 30 have a plurality of vent holes 31*a*, 32*a*, respectively. The vent holes 31*a* are longitudinally long holes in an illustrated example. The lower cover 31 may be, for example, a punching metal. In such a case, the vent holes 31*a* are holes in a punching metal. It is preferable for holes in a punching metal to have a diameter of about 5 mm or less.

Although not being illustrated in the drawings, the SCR 21 is disposed in back of the front wheel 3 (see FIG. 1). The lower cover 31 that covers the SCR 21 has the vent holes 31*a* at a site that does not face the front wheel 3. In other words, the lower cover 31 does not have any of the vent holes 31*a* at a site that faces the front wheel 3.

It is sufficient for a site that has the vent holes 31*a* in the lower cover 31 to avoid a range that faces the front wheel 3 when viewed from the front wheel 3. Therefore, for example, in a case where the lower cover 31 is arranged to be shifted to one of left and right sides when viewed from the front wheel 3, a site that has the vent holes 31*a* is shifted to one of left and right sides with respect to a case where the lower cover 31 is provided in alignment with the front wheel 3. It is preferable to provide the vent holes 31*a* in a range of about two-thirds of a whole peripheral surface of the lower cover 31 with a cylindrical shape from a back side thereof.

According to such a configuration, the lower cover 31 does not have any of the vent holes 31*a* at a site that faces the front wheel 3, so that it is possible to prevent an inside of the lower cover 31 from being dirtied by mud or the like, or mud or the like from accumulating inside the lower cover 31, due to a mud splash of the front wheel 3 that is arranged in front of the lower cover 31, or the like. It is also possible to prevent the SCR 21 from dirtying.

Herein, a foreign substance such as a grass, a branch, rubbish, or a leaf of a tree may be introduced into an inside of the cover 30 through the vent holes 30*a* during an operation of the tractor 1 or the like. Such a foreign substance may be introduced through, for example, an opening in an upper surface of the cover 30, as well as the vent holes 30*a*. Thus, as a foreign substance is introduced into the cover 30, the introduced foreign substance may accumulate inside the cover 30. A foreign substance accumulates inside the cover 30 that covers the SCR 21.

Thus, as a foreign substance accumulates inside the cover 30, a problem may occur in such a manner that heat from the SCR 21, the tail pipe 22, or the like is trapped inside the cover 30, or the like.

Accordingly, the lower cover 31 has openings 35 on bottom thereof, as illustrated in FIG. 3. Such openings 35 are formed in the lower cover 31 by notching a bottom edge of the lower cover 31. That is, the openings 35 are notches that are formed on a bottom edge of the lower cover 31. As illustrated in the figure, the plurality of openings 35 are formed along a periphery of a bottom edge of the lower cover 31.

According to such a configuration, the lower cover 31 that covers the SCR 21 has the openings 35 on bottom thereof, so that a foreign substance introduced into an inside of the lower cover 31 is discharged to an outside of the lower cover 31. In detail, a foreign substance on the mounting surface 25*a* of the supporting member 25 with the SCR 21 being mounted thereon, inside the lower cover 31, is discharged through the openings 35, so that it is possible to prevent a foreign substance from accumulating inside the lower cover 31. Thereby, it is possible to prevent a problem from occurring in such a manner that heat from the SCR 21 or the tail pipe 22 is trapped inside the cover 30, or the like.

The openings 35 are notches formed on a bottom edge of the lower cover 31, so that it is possible to arrange the openings 35 on bottom of the lower cover 31. Thereby, a foreign substance is readily discharged through the openings 35.

Each of the plurality of vent holes 30*a* (vent holes 31*a* and vent holes 32*a*) provided in the cover 30 is formed to have a diameter less than those of the openings 35. In other words, an opening area of each of the vent holes 31*a*, 32*a* is less than opening areas of the openings 35. Accordingly, a foreign substance introduced through the vent holes 31*a*, 32*a* is readily discharged through the openings 35. Thereby, it is possible to prevent a foreign substance from accumulating inside the lower cover 31.

In a case where the lower cover 31 is formed of a punching metal, a foreign substance is not readily introduced through the vent holes 31*a*, and even in a case where a foreign substance is introduced therein, the introduced foreign substance is greatly smaller than the openings 35, and hence, the foreign substance is readily discharged through the openings 35.

Although the openings 35 of the lower cover 31 as described above are notches, a configuration may be provided in such a manner that, for example, the mounting surface 25*a* of the supporting member 25 is formed to have a size comparable to that of a bottom surface of the SCR 21 and an opening is provided between an opening of a bottom surface of the lower cover 31 and an edge of the mounting surface 25*a*. In a case where such a configuration is provided, a foreign substance introduced into an inside of the lower cover 31 directly falls onto an outside thereof through such an opening without falling onto the mounting surface 25*a* with the SCR 21 being provided to stand thereon, and hence, the foreign substance does not accumulate inside the lower cover 31.

Urea Water Solution Pump

Next, a urea water solution pump 40 will be described with reference to FIG. 3. The urea water solution pump 40 supplies a urea water solution to the SCR 21. As illustrated in FIG. 3, the tractor 1 includes the urea water solution pump 40 provided on a lower side of the running vehicle body 2, specifically, under the cabin 6, and close to the SCR 21 inside a boarding step 15. Thus, the urea water solution pump 40 is provided in a space inside the boarding step 15, so that it is possible to utilize a machine body space effectively. A size of a machine body is not increased, and hence, it is possible to reduce a cost of manufacturing.

A pump cover 41 with a plate-like shape is attached to the urea water solution pump 40. The pump cover 41 is made of, for example, a metal, and is formed so as to cover an externally exposed surface of the urea water solution pump 40. Thereby, it is possible to prevent mud or the like from adhering to the urea water solution pump 40, and it is possible to improve an effect of cooling the urea water solution pump 40 because the pump cover 41 is metallic.

The urea water solution pump 40 is hidden by the pump cover 41, and hence, it is possible to improve an aesthetic appearance of a machine body. The pump cover 41 is provided outside a connection hose for urea 42 that connects the urea water solution pump 40 to at least one of a urea water solution tank and a urea injection device (for both of them, illustration omitted), as well as to the urea water solution pump 40. Moreover, the urea water solution pump 40 is provided so as to cover another supply module such as a joystick valve (illustration omitted).

According to such a configuration, the pump cover 41 is arranged outside the connection hose for urea 42, so that it is possible to prevent a temperature rise of the connection hose for urea 42, due to a cooling effect of the pump cover 41, and prevent damage of the connection hose for urea 42.

The pump cover 41 is provided with vent holes 41a with a slit-like shape. Thereby, it is possible to transfer heat of the urea water solution pump 40 to an outside thereof and it is possible to improve a cooling effect of the urea water solution pump 40. A good appearance is provided in a design and it is possible to improve an aesthetic appearance of a machine body.

Example of Arrangement of Fuel Tank (Fuel Main Tank)

Next, an example of arrangement of a fuel tank 50 will be described with reference to FIG. 3. As illustrated in FIG. 3, the fuel tank 50 that stores a fuel that is supplied to the engine E (see FIG. 1) is provided on one of left and right sides (a right side in an illustrated example) of the running vehicle body 2 and in back of the SCR 21. Although not being illustrated in the drawings, the fuel tank 50 is provided on a lower side of the running vehicle body 2 and from side to side in the running vehicle body 2. Hereinafter, the fuel tank 50 will be referred to as a "fuel main tank" to be distinguished from a fuel sub-tank 60 as described later.

As illustrated in FIG. 3, for example, a heat shield member 51 made of a metal and having a plate-like shape that has a function of a cover for the fuel main tank 50 and separates the fuel main tank 50 and the SCR 21 is provided between the fuel main tank 50 and the SCR 21.

According to such a configuration, the heat shield member 51 separates the fuel main tank 50 and the SCR 21, so that it is possible to prevent a temperature of a fuel in the fuel main tank 50 from rising due to heat of the SCR 21 that is provided at a high temperature.

Example of Arrangement of Fuel Sub-Tank

Figure 4:
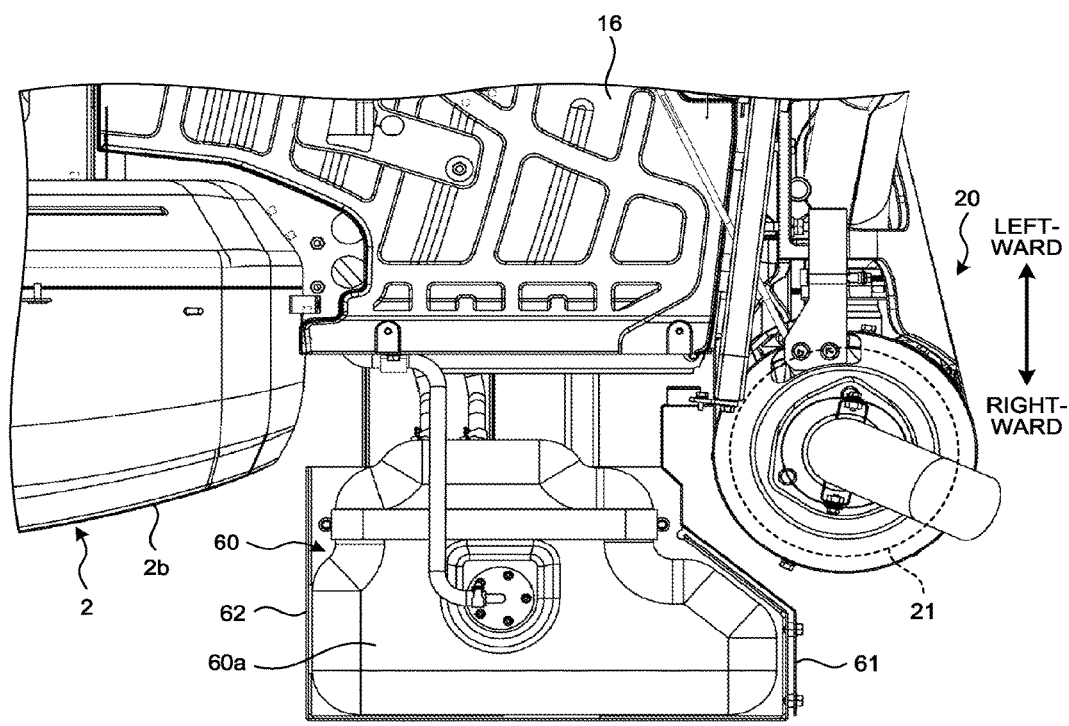
FIG. 4 is an illustration diagram of a fuel sub-tank.
Figure 5:
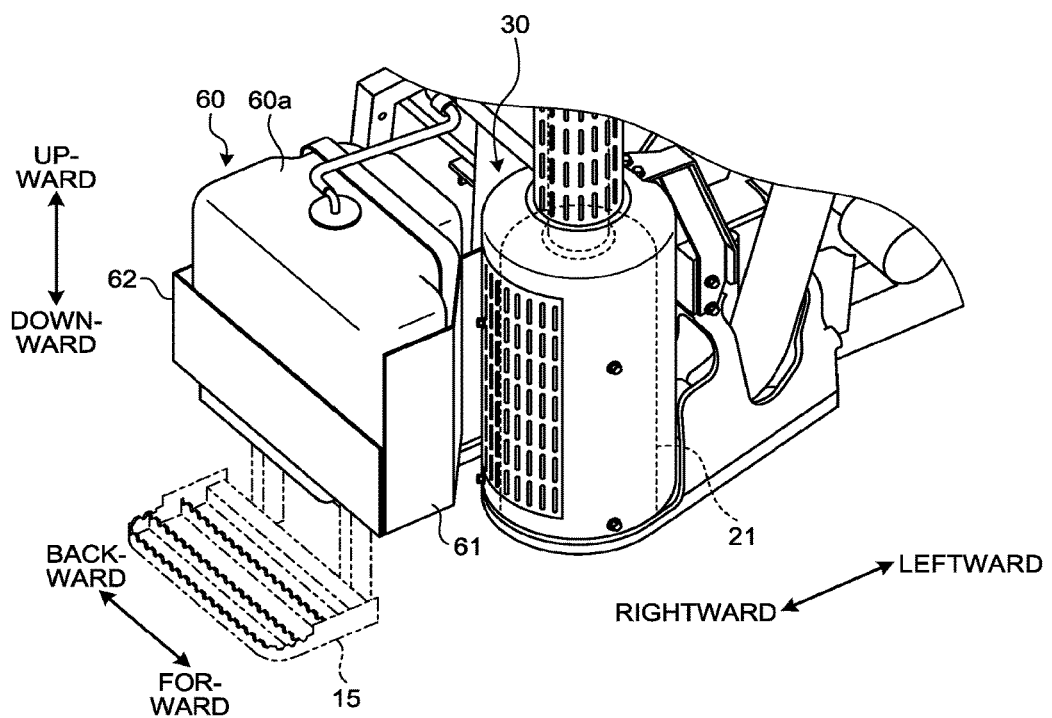
FIG. 5 is an illustration diagram of an example of arrangement of a fuel sub-tank.

Next, an example of arrangement of a fuel sub-tank 60 will be described with reference to FIG. 4 and FIG. 5. FIG. 4 is an illustration diagram of the fuel sub-tank 60. FIG. 5 is an illustration diagram of an example of arrangement of the fuel sub-tank 60. FIG. 4 illustrates a case where a right side part of a machine body is viewed from above and FIG. 5 schematically illustrates a case where the machine body is viewed from diagonally forward right side.

The fuel sub-tank 60 increases a volume of a fuel in the fuel main tank 50 (see FIG. 3). The fuel sub-tank 60 stores a fuel that is supplied to the engine E through a system separate from that of the fuel main tank 50. As illustrated in FIG. 4, the fuel sub-tank 60 is disposed on one of left and right sides (a right side in an illustrated example) of the running vehicle body 2 and in back of the SCR 21.

Specifically, the fuel sub-tank 60 is disposed in a space between the SCR 21 and the rear fender 2b of the running vehicle body 2 in forward and backward directions. Thus, the fuel sub-tank 60 is disposed by utilizing a space between the SCR 21 and the rear fender 2b, so that it is possible to increase a volume of a fuel in the fuel main tank 50 and provide a configuration that does not disturb work of a worker.

As illustrated in FIG. 4, for example, a heat shield member 61 made of a metal and having a plate-like shape that has a function of a front side cover for the fuel sub-tank 60 and separates the fuel sub-tank 60 and the SCR 21 is provided between the fuel sub-tank 60 and the SCR 21.

According to such a configuration, the heat shield member 61 separates the fuel sub-tank 60 and the SCR 21, so that it is possible to prevent a temperature of a fuel in the fuel sub-tank 60 from rising due to heat of the SCR 21 that is provided at a high temperature. In a case where the tractor 1 (see FIG. 1) is caused to run, for example, in an orchard or between crops, it is possible to prevent a plant or the like from being introduced into the exhaust pipeline 20 that includes the SCR 21 or the like.

The fuel sub-tank 60 is provided with a back side cover 62 in back of the heat shield member 61. That is, one of front, back, left, and right sides (a right side in an illustrated example) of the fuel sub-tank 60 is covered by the heat shield member 61 and the cover 62. The other of left and right sides (a left side in an illustrated example) of the fuel sub-tank 60 is protected with a frame of the running vehicle body 2.

The cover 62 has a part that overlaps with the heat shield member 61. Such an overlapping part of the cover 62 protects a front side of the fuel sub-tank 60 and fixes the heat shield member 61. The heat shield member 61 has a shape that is upwardly longer than that of the cover 62 in order to improve a heat insulating effect between the SCR 21 and the fuel sub-tank 60.

The fuel sub-tank 60 is provided by removing one boarding step 15 among the boarding steps 15, 15 (see FIG. 1) provided on outer left and right sides of the cabin 6. In a case where the fuel sub-tank 60 is provided, an operator boards or alights from a machine body by using the boarding step 15 on an opposite side among left and right sides of the cabin 6.

As illustrated in FIG. 5, the fuel sub-tank 60 is provided in such a manner that an upper surface 60a thereof is lower than a step floor 16 (see FIG. 4) of the cabin 6 by one step. Accordingly, the upper surface 60a of the fuel sub-tank 60 and the step floor 16 provide a step-like shape, so that an operator readily boards or alights.

In a case where the boarding step 15 is removed to provide the fuel sub-tank 60, the fuel sub-tank 60 is arranged in a space where the boarding step 15 had been provided, as described above, and hence, a space for arranging the fuel sub-tank 60 need not newly be secured. Thus, it is possible to secure a volume of the fuel sub-tank 60, with a simple structure.

As illustrated in FIG. 5, the fuel sub-tank 60 may be provided without removing the boarding step 15 to provide a step structure that is provided by the boarding step 15, the upper surface 60a of the fuel sub-tank 60, and the step floor 16 (see FIG. 4).

Figure 6:
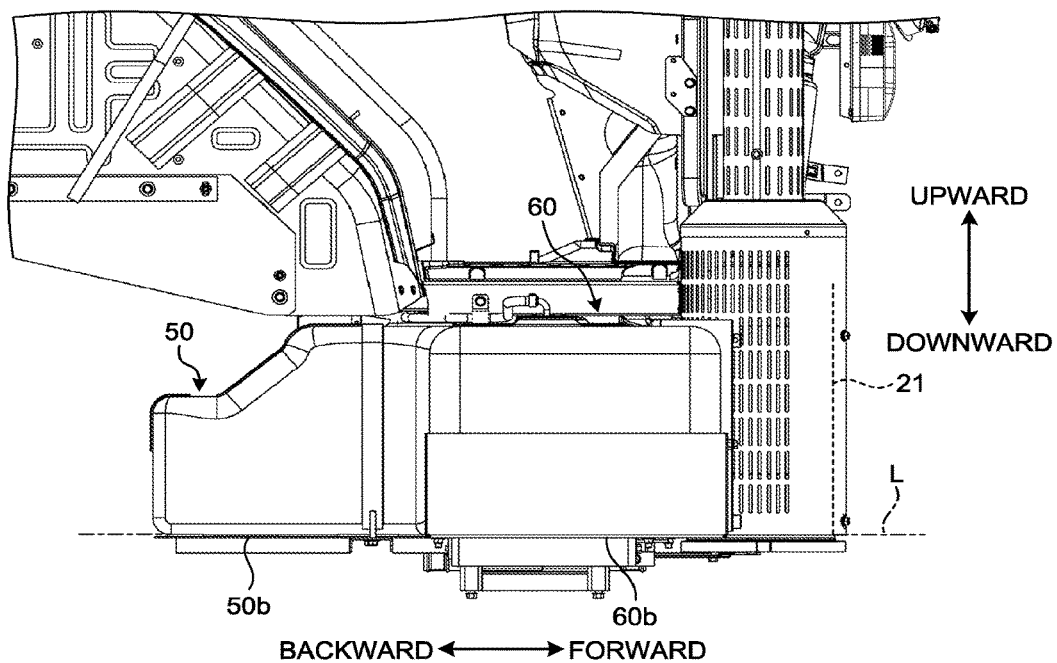
FIG. 6 is an illustration diagram of another example of arrangement of a fuel tank and a fuel sub-tank.

Herein, another example of arrangement of the fuel main tank 50 and the fuel sub-tank 60 will be described with reference to FIG. 6. FIG. 6 is an illustration diagram of another example of arrangement of the fuel tank (fuel main tank) 50 and the fuel sub-tank 60. FIG. 6 illustrates a case where a machine body is viewed from a right side.

As illustrated in FIG. 6, in a case where the fuel main tank 50 and the fuel sub-tank 60 are arranged side by side in forward and backward directions on a right side of the running vehicle body 2 and in back of the SCR 21, it is preferable to provide a configuration in such a manner that a bottom surface 50b of the fuel main tank 50 and a bottom surface 60b of the fuel sub-tank 60 are positioned at comparable heights (on a reference line L).

According to such a configuration, level control of a fuel is facilitated, so that, for example, an operator readily recognizes a total amount of a fuel or the like and management of a remaining amount of fuel is facilitated. In a case where the fuel main tank 50 and the fuel sub-tank 60 are provided at different heights, fuel leakage may occur, so that quality control against fuel leakage is not simple. Accordingly, it is preferable to arrange the fuel main tank 50 and the fuel sub-tank 60 at comparable heights.

A configuration may be provided in such a manner that, for example, the fuel sub-tank 60 is connected to the fuel main tank 50 and a fuel is supplied from the fuel main tank 50 to the engine E. In such a case, as illustrated in FIG. 6, it is preferable to arrange the fuel sib-tank 60 close to the fuel main tank 50.

In such a case, it is preferable to connect the fuel sub-tank 60 to the fuel main tank 50 with, for example, two or more hoses. Thereby, it is possible to secure fluidity between the fuel sub-tank 60 and the fuel main tank 50. A check valve may be provided on a hose that connects the fuel sub-tank 60 and the fuel main tank 50. Thereby, it is possible to prevent a fuel from flowing backward from the fuel main tank 50 between the fuel sub-tank 60 and the fuel main tank 50.

A working vehicle as described in embodiment (1) includes an exhaust pipeline (20) that includes an exhaust gas purification device (21), and a cover (30) that is provided to cover at least a peripheral surface of the exhaust gas purification device (21) of the exhaust pipeline (20) and has an opening (35) in a bottom thereof, wherein the cover (30) has a plurality of vent holes (30a) with a diameter less than that of the opening (35) that are formed above the opening (35).

According to embodiment (1) as described above, a cover has an opening in a bottom thereof, so that a foreign substance such as a grass or a branch introduced into an inside of the cover is discharged to an outside of the cover and it is possible to prevent a foreign substance from accumulating inside the cover. Thereby, it is possible to prevent a problem from occurring in such a manner that heat is trapped inside a cover, or the like. A cover has a plurality of vent holes, so that it is possible to improve a heat-releasing effect thereof. Vent holes have a diameter less than that of an opening, and hence, a foreign substance introduced through the vent holes is readily discharged through the opening. Thereby, it is possible to prevent a foreign substance from accumulating inside a cover.

A working vehicle as described in embodiment (2) is the working vehicle as described in embodiment (1), wherein the exhaust gas purification device (21) is provided to stand on one of left and right sides of a running vehicle body (2), and the opening (35) is a notch that is formed on a bottom edge of the cover (30).

According to embodiment (2) as described above, an opening is a notch formed on a bottom edge of a cover in the working vehicle as described in embodiment (1), so that it is possible to arrange the opening on a bottom of the cover. Thereby, a foreign substance is readily discharged through an opening.

A working vehicle as described in embodiment (3) is the working vehicle as described in embodiment (1), which further includes front wheels (3, 3) that are provided on left and right sides of a hood (2a) that covers an engine (E), wherein the exhaust gas purification device (21) is disposed in back of one of the front wheels (3, 3) and the cover (30) has the vent holes (35) only at a site that does not face the one of the front wheels (3, 3).

According to embodiment (3) as described above, a cover has vent holes in a site that does not face a front wheel, in other words, does not have a vent hole in a site that faces the front wheel, so that it is possible to prevent an inside of the cover from being dirtied by mud or the like, or mud or the like from accumulating inside the cover, due to a mud splash by the front wheel, in addition to an effect of embodiment (1).

A working vehicle as described in embodiment (4) is the working vehicle as described in embodiment (1), which further includes a fuel tank (50) that is disposed in back of the exhaust gas purification device (21) and supplies a fuel to an engine (E), and a heat shield member (51) that separates the exhaust gas purification device (21) and the fuel tank (50), between the exhaust gas purification device (21) and the fuel tank (51).

According to embodiment (4) as described above, a heat shield member between an exhaust gas purification device and a fuel tank separates both of them, so that it is possible to prevent a temperature rise inside the fuel tank that is influenced by the exhaust gas purification device that is provided at a high temperature, in addition to an effect of embodiment (1).

A working vehicle as described in embodiment (5) is the working vehicle as described in embodiment (1), which further includes a fuel sub-tank (60) that is disposed in back of the exhaust gas purification device (21) and increases a fuel volume of a fuel tank (50) that supplies a fuel to an engine (E), and a heat shield member (61) that separates the exhaust gas purification device (21) and the fuel sub-tank (60), between the exhaust gas purification device (21) and the fuel sub-tank (60).

According to embodiment (5) as described above, a fuel sub-tank is provided additionally, so that it is possible to increase a volume of a fuel that is supplied to an engine, in addition to an effect of embodiment (1). A heat shield member between an exhaust gas purification device and a fuel tank separates both of them, so that it is possible to prevent a temperature rise inside the fuel sub-tank that is influenced by the exhaust gas purification device that is provided at a high temperature.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A working vehicle, comprising:
an exhaust gas purification device;
a tail pipe above the exhaust gas purification device;
an upper cover that covers the tail pipe; and a lower cover that is provided to cover a peripheral surface of the exhaust gas purification device and has an opening in a bottom thereof, wherein the lower cover has a plurality of vent holes with a diameter less than that of the opening that are formed above the opening of the lower cover, the exhaust gas purification device is provided to stand on one of left and right sides of a running vehicle body, and the opening is a notch that is formed on a bottom edge of the lower cover so that a foreign substance inside the lower cover is discharged through the notch.

2. A working vehicle, comprising:

an exhaust gas purification device;

a tail pipe above the exhaust gas purification device;

an upper cover that covers the tail pipe;

a lower cover that is provided to cover a peripheral surface of the exhaust gas purification device and has an opening in a bottom thereof; and front wheels that are provided on left and right sides of a hood that covers an engine, wherein the lower cover has a plurality of vent holes with a diameter less than that of the opening that are formed above the opening of the lower cover, the exhaust gas purification device is disposed in back of one of the front wheels, the lower cover has the vent holes on a rear surface thereof only at a location that does not face the one of the front wheels, and the opening is a notch that is formed on a bottom edge of the lower cover so that a foreign substance inside the lower cover is discharged through the notch.

3. A working vehicle, comprising:

an exhaust gas purification device;

a tail pipe above the exhaust gas purification device;

an upper cover that covers the tail pipe;

a lower cover that is provided to cover a peripheral surface of the exhaust gas purification device and has an opening in a bottom thereof;

a fuel tank that is disposed in back of the exhaust gas purification device and supplies a fuel to an engine; and a heat shield member that separates the exhaust gas purification device and the fuel tank, between the exhaust gas purification device and the fuel tank, wherein the lower cover has a plurality of vent holes with a diameter less than that of the opening that are formed above the opening of the lower cover, and the opening is a notch that is formed on a bottom edge of the lower cover so that a foreign substance inside the lower cover is discharged through the notch.

4. The working vehicle according to claim 1, further comprising:

a fuel sub-tank that is disposed in back of the exhaust gas purification device and increases a fuel volume of a fuel tank that supplies a fuel to an engine; and a heat shield member that separates the exhaust gas purification device and the fuel sub-tank, between the exhaust gas purification device and the fuel sub-tank.

* * * * *